US008771054B2

(12) United States Patent
Aoki et al.

(10) Patent No.: US 8,771,054 B2
(45) Date of Patent: Jul. 8, 2014

(54) WAGERING GAME WITH PERSISTENT WILD SYMBOL REEL POSITIONS

(75) Inventors: Dion K. Aoki, Henderson, NV (US); Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 775 days.

(21) Appl. No.: 12/665,347

(22) PCT Filed: Jun. 20, 2008

(86) PCT No.: PCT/US2008/007730

§ 371 (c)(1),
(2), (4) Date: Dec. 18, 2009

(87) PCT Pub. No.: WO2008/156846

PCT Pub. Date: Dec. 24, 2008

(65) Prior Publication Data

US 2010/0197377 A1 Aug. 5, 2010

Related U.S. Application Data

(60) Provisional application No. 60/936,580, filed on Jun. 21, 2007, provisional application No. 60/999,341, filed on Oct. 17, 2007.

(51) Int. Cl.
*A63F 13/00* (2014.01)

(52) U.S. Cl.
USPC .............................................. 463/20; 463/21

(58) Field of Classification Search
USPC .............................................. 463/20, 21, 16
See application file for complete search history.

(56) References Cited

U.S. PATENT DOCUMENTS

| | | | | |
|---|---|---|---|---|
| 5,997,401 | A | 12/1999 | Crawford | |
| 6,270,412 | B1 | 8/2001 | Crawford et al. | |
| 6,311,976 | B1 * | 11/2001 | Yoseloff et al. | 273/138.2 |
| 6,439,993 | B1 | 8/2002 | O'Halloran | |
| 6,494,454 | B2 | 12/2002 | Adams | |
| 6,517,432 | B1 | 2/2003 | Jaffe | |
| 6,551,187 | B1 | 4/2003 | Jaffe | |
| 6,616,142 | B2 | 9/2003 | Adams | |
| 6,780,109 | B2 | 8/2004 | Kaminkow | |
| 6,805,349 | B2 | 10/2004 | Baerlocher et al. | |
| 6,805,632 | B2 | 10/2004 | Suda | |
| 6,866,583 | B2 | 3/2005 | Glavich et al. | |
| 6,905,406 | B2 | 6/2005 | Kaminkow et al. | |
| 6,921,335 | B2 | 7/2005 | Rodgers et al. | |

(Continued)

OTHER PUBLICATIONS

Written Opinion corresponding to co-pending International Patent Application Serial No. PCT/US2008/007730, United States Patent Office, dated Oct. 2, 2008.

(Continued)

*Primary Examiner* — Arthur O Hall
*Assistant Examiner* — Allen Chan
(74) *Attorney, Agent, or Firm* — Nixon Peabody LLP

(57) ABSTRACT

A gaming system for conducting a wagering game comprises a display including a plurality of symbol-bearing reels having a plurality of symbol locations and symbols that indicate a randomly selected outcome of the wagering game. In response to a certain event, at least one symbol on the reels in a particular one of the plurality of symbol locations is altered to produce an altered function of the symbol. The altered function of the altered symbol at the particular symbol location is maintained for subsequent plays of the wagering game.

25 Claims, 8 Drawing Sheets

(56) References Cited

U.S. PATENT DOCUMENTS

| | | | | |
|---|---|---|---|---|
| 6,939,228 | B2 | 9/2005 | Shimizu | |
| 7,056,213 | B2 | 6/2006 | Ching et al. | |
| 7,074,127 | B2 | 7/2006 | Cuddy et al. | |
| 7,090,580 | B2 | 8/2006 | Rodgers et al. | |
| 7,137,888 | B2 | 11/2006 | Glavich et al. | |
| 7,169,042 | B2 | 1/2007 | Muir et al. | |
| 7,326,113 | B2 | 2/2008 | Bennett et al. | |
| 7,399,225 | B2 | 7/2008 | Kaminkow | |
| 2002/0047238 | A1 | 4/2002 | Ainsworth et al. | |
| 2002/0052233 | A1 | 5/2002 | Gauselmann | |
| 2002/0082075 | A1 | 6/2002 | Meyer | |
| 2003/0013517 | A1 | 1/2003 | Bennett et al. | |
| 2003/0054874 | A1 | 3/2003 | Kaminkow | |
| 2003/0057645 | A1 | 3/2003 | Baerlocher et al. | |
| 2003/0060267 | A1 | 3/2003 | Glavich et al. | |
| 2003/0064779 | A1 | 4/2003 | Suda | |
| 2003/0064802 | A1 | 4/2003 | Rodgers et al. | |
| 2003/0069062 | A1 | 4/2003 | Shimizu | |
| 2003/0203752 | A1 | 10/2003 | Kaminkow et al. | |
| 2003/0203753 | A1 | 10/2003 | Muir et al. | |
| 2003/0207709 | A1 | 11/2003 | Paotrakul | |
| 2003/0220134 | A1* | 11/2003 | Walker et al. | 463/20 |
| 2004/0038730 | A1 | 2/2004 | Suda | |
| 2004/0048646 | A1 | 3/2004 | Visocnik | |
| 2004/0048652 | A1 | 3/2004 | Ching et al. | |
| 2004/0053676 | A1 | 3/2004 | Rodgers | |
| 2004/0072612 | A1 | 4/2004 | Rodgers et al. | |
| 2004/0137982 | A1 | 7/2004 | Cuddy et al. | |
| 2004/0198489 | A1* | 10/2004 | Kaminkow et al. | 463/20 |
| 2004/0214634 | A1* | 10/2004 | Fasbender et al. | 463/25 |
| 2005/0020344 | A1 | 1/2005 | Kaminkow | |
| 2005/0049035 | A1 | 3/2005 | Baerlocher et al. | |
| 2005/0054412 | A1 | 3/2005 | Gauselmann | |
| 2005/0064924 | A1 | 3/2005 | Glavich et al. | |
| 2005/0101369 | A1 | 5/2005 | Meyer | |
| 2005/0101380 | A1 | 5/2005 | Glavich et al. | |
| 2005/0148384 | A1 | 7/2005 | Marks et al. | |
| 2005/0164775 | A1 | 7/2005 | Rodgers et al. | |
| 2006/0068881 | A1 | 3/2006 | Casey | |
| 2006/0142077 | A1* | 6/2006 | Miles et al. | 463/20 |
| 2006/0172796 | A1 | 8/2006 | Vancura | |
| 2006/0281525 | A1 | 12/2006 | Borissov | |
| 2007/0021188 | A1 | 1/2007 | Rodgers et al. | |

OTHER PUBLICATIONS

International Search Report corresponding to co-pending International Patent Application Serial No. PCT/US2008/007730, United States Patent Office, dated Oct. 2, 2008.

International Preliminary Report on Patentability corresponding to co-pending International Patent Application Serial No. PCT/US2008/007730, United States Patent Office, dated Jun. 16, 2009.

Written Opinion corresponding to Australian Patent Application No. 2008266824, Australian Patent Office; dated Sep. 2, 2010; 2 pages.

Notice of Acceptance corresponding to Australian Patent Application No. 2008266824, Australian Patent Office; dated Jul. 20, 2011; 1 page.

* cited by examiner

WAGERING GAME WITH PERSISTENT WILD SYMBOL REEL POSITIONS

CROSS REFERENCE TO RELATED APPLICATIONS

This application is a U.S. national stage of International Application No. PCT/US2008/007730, filed Jun. 20, 2008, which claims the benefit of U.S. Provisional Application No. 60/936,580, filed Jun. 21, 2007, and U.S. Provisional Application No. 60/999,341, filed Oct. 17, 2007, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly to gaming systems having reel locations with symbols that may be altered and that remain altered for the particular reel location during play of the wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a gaming system for conducting a wagering game includes a gaming system for playing a wagering game comprising a display including a plurality of symbol-bearing reels. Each reel includes a plurality of symbol locations having symbols that indicate a randomly selected outcome of the wagering game. In response to a certain event, at least a first symbol on the reels in a particular one of the plurality of symbol locations is altered to produce an altered function of the first symbol. The altered function of the first symbol at the particular symbol location is maintained for at least one subsequent play of the wagering game.

According to another aspect of the invention, a method of conducting a wagering game on a gaming system comprises a method of conducting a wagering game on a gaming system. The method comprises the acts of receiving a wager from a player to initiate play of the wagering game and displaying a plurality of symbol-bearing reels. Each reel includes a plurality of symbol locations having respective symbols that indicate a randomly selected outcome of the wagering game. The method further comprises, in response to a certain event, altering one of the symbols to change the function of the symbol in a particular one of the plurality of symbol locations. The altered symbol is maintained in the particular symbol location for subsequent plays of the wagering game.

According to yet another aspect of the invention, a computer readable storage medium is encoded with instructions for directing a gaming system to perform the above method.

According to a further embodiment, a gaming system comprises an input device for receiving a wager from a player to initiate a wagering game and a display for displaying a plurality of reels. Each reel has a plurality of symbol locations. The gaming system also comprises a controller operative to alter the function of a first symbol in a particular symbol location, to create an altered-function symbol, in response to a special event. The alteration of the first symbol does not alter the function of other like symbols that are not part of the special event. The controller is further operative to maintain the altered-function symbol in the particular symbol location for subsequent game play and to award a payout in response to the altered-function symbol being included in a winning outcome in the subsequent game play of the wagering game.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
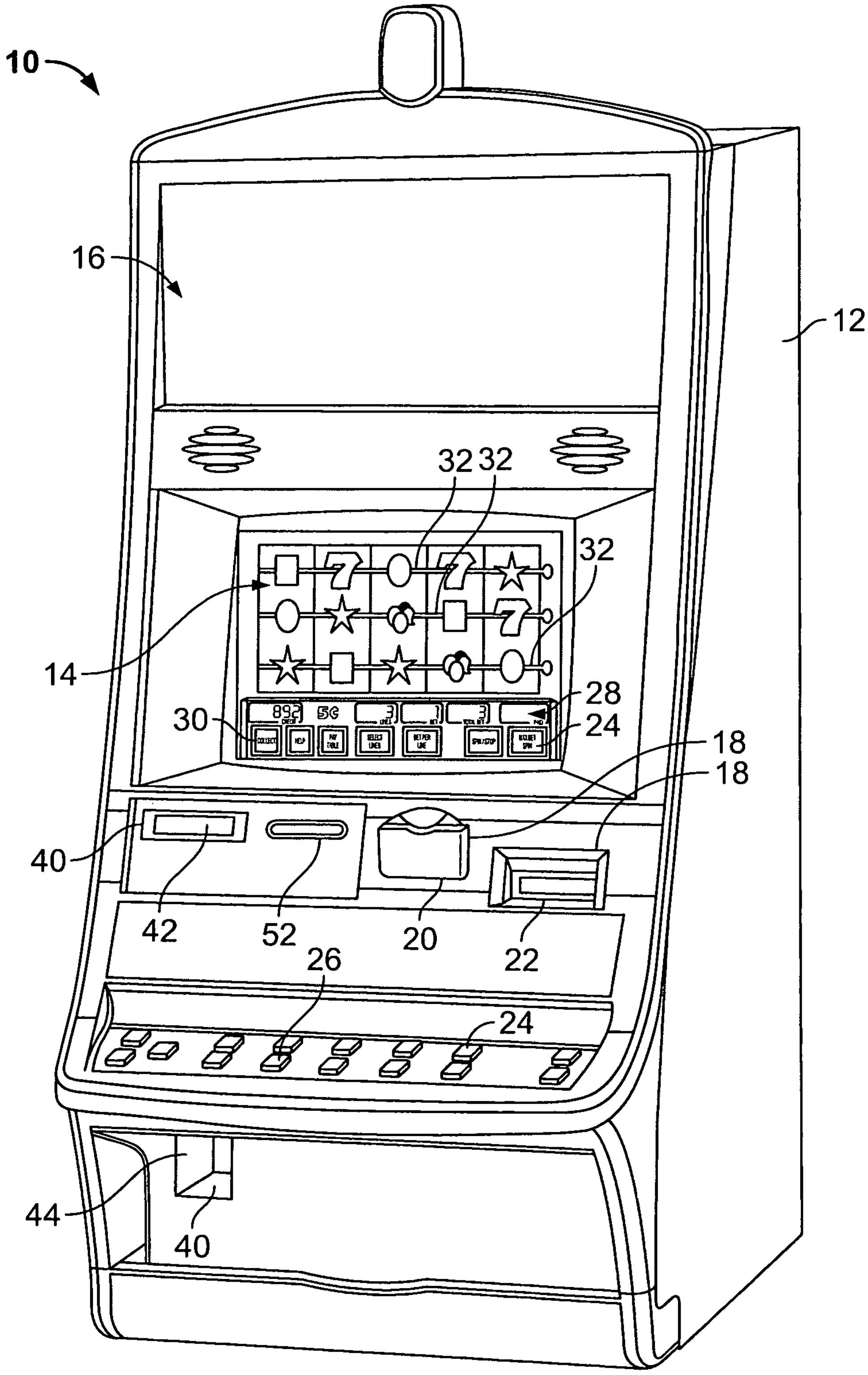
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel.

The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical or video reels to display the outcome in visual association with at least one pay line 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one pay line 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
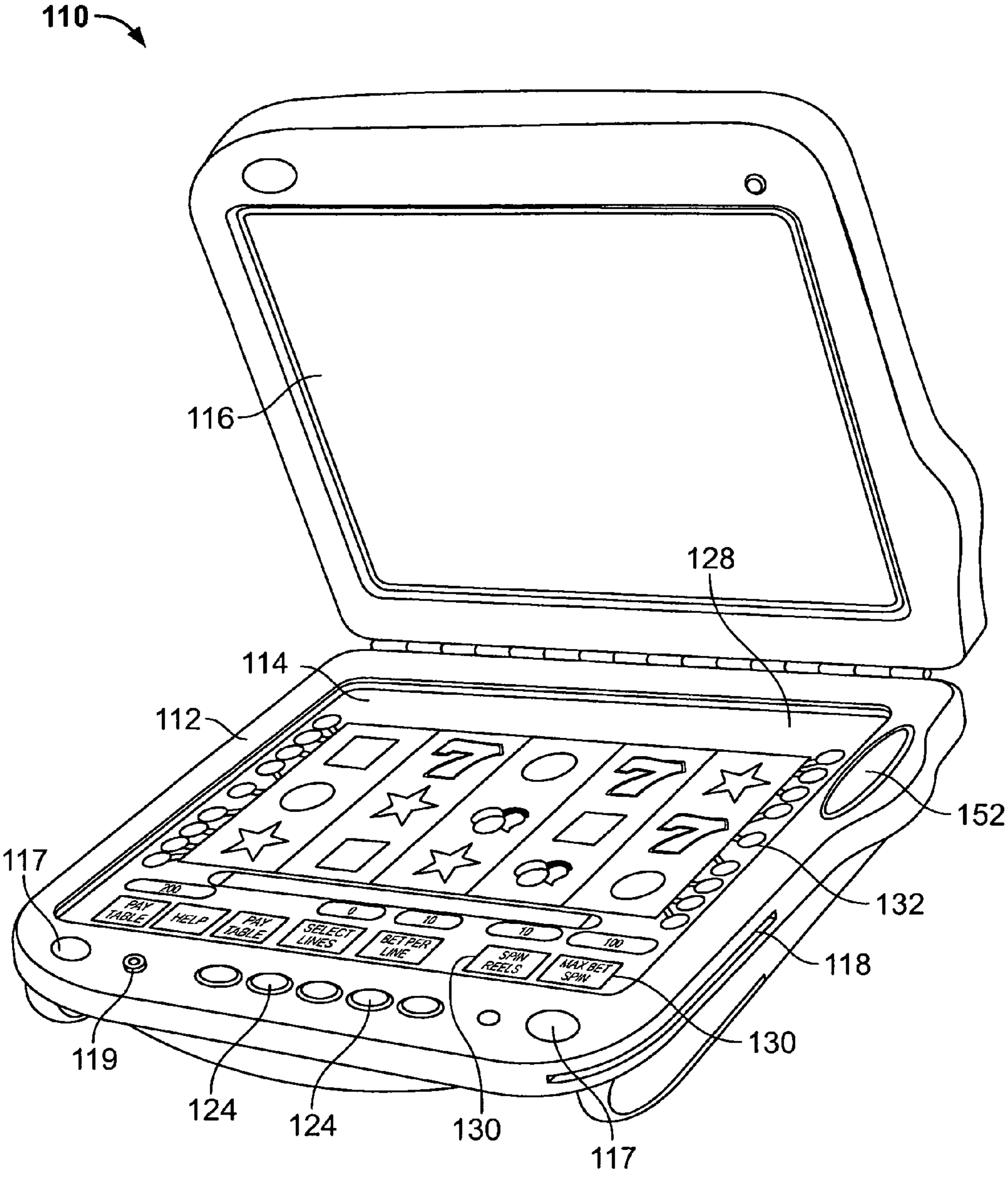
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one pay line 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
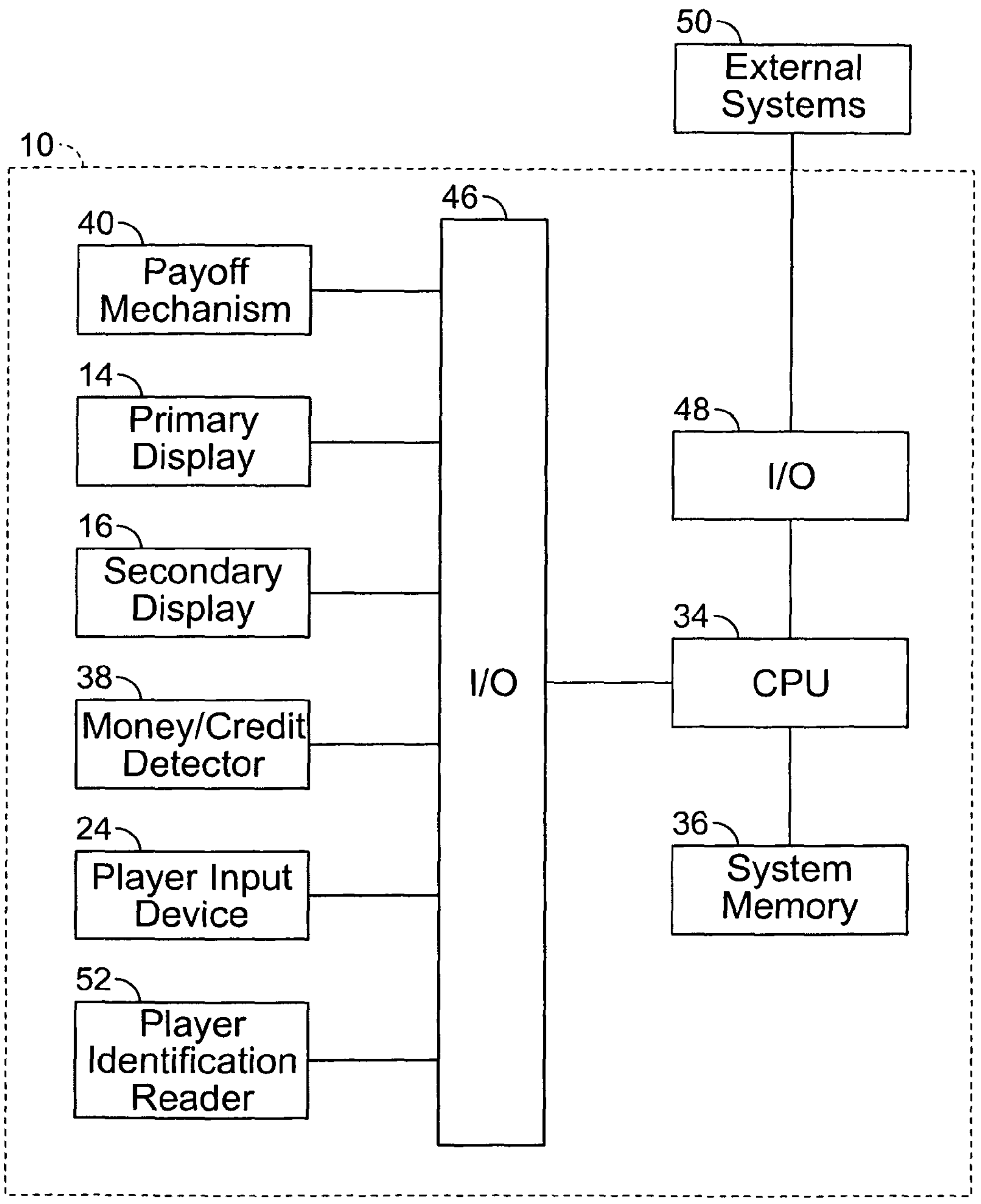
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security_: 802.11, Bluetooth and Handheld Devices, both of which are incorporated herein by reference in their entirety.

Figure 3:
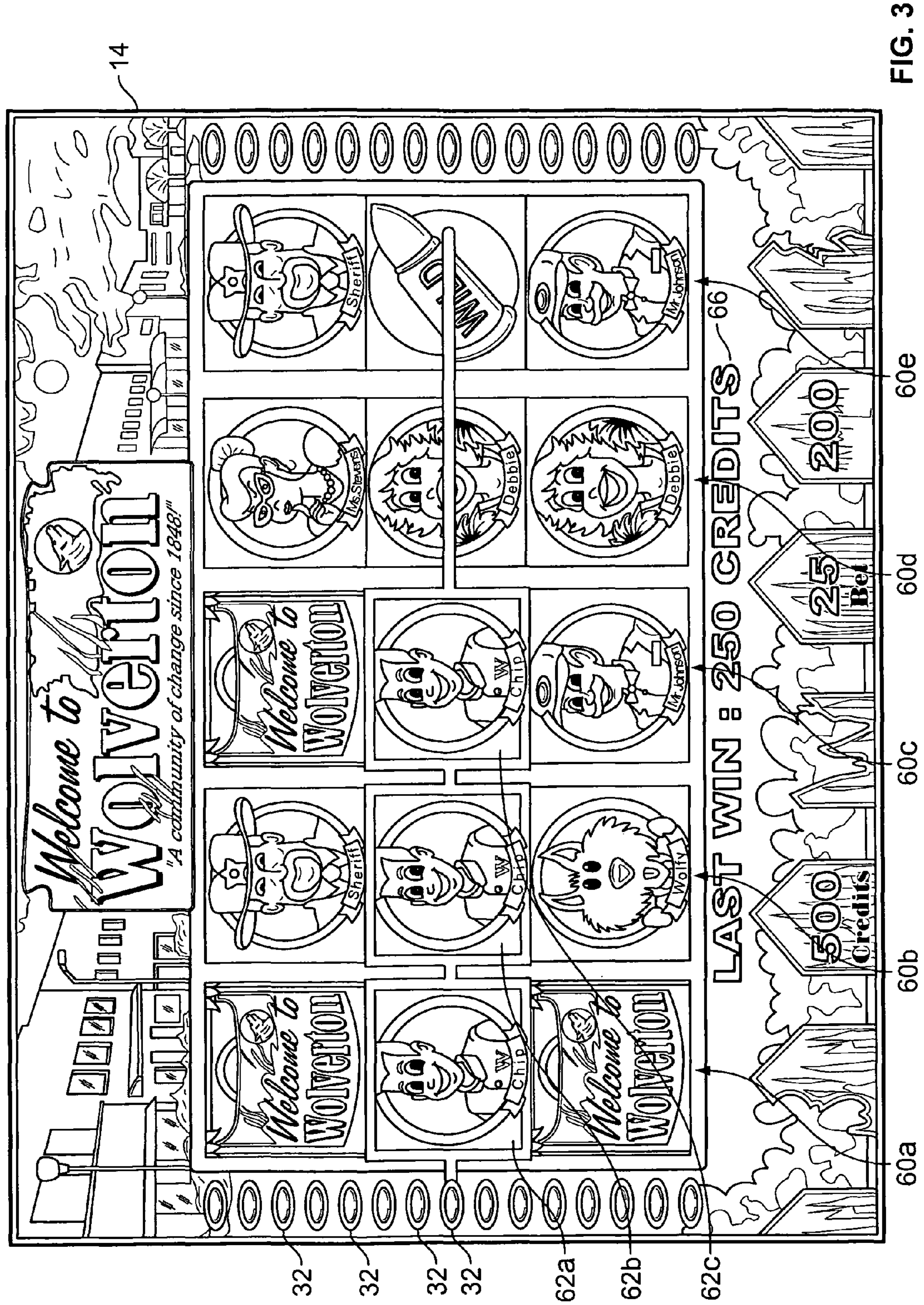
FIG. 3 is a view of a display associated with a wagering game showing a winning symbol combination on a plurality of reels.

Turning now to FIG. 3, a primary display 14 for displaying the basic game, the bonus game or both, is shown having five reels 60*a-e* with a number of pay lines 32. The reels 60*a-e* may be mechanical reels or video reels. Each of the reels 60*a-e* has a number of reel locations, i.e., 22 locations (see FIGS. 4*a* and 4*b*). Each of the locations includes a symbol associated with the particular reel location. The number of reels and pay lines may be varied to include more or less than the number shown in FIG. 3. Additionally, the number of symbol-bearing locations may be varied, although each reel 60*a-e* generally contains the same number of symbol-bearing locations. In one typical arrangement, each of the pay lines 32 in FIG. 3 extends through one symbol on each of the of reels 60*a-e*. However, it is possible that the reels may stop at half positions such that one or more paylines 32 is between each adjacent symbol.

Generally, game play is initiated by inserting money via the value input device 18 or by playing a number of credits, causing the controller 34 to activate a number of pay lines 32 corresponding to the amount of money or number of credits played. In some embodiments, the player selects the number of pay lines 32 to play and then chooses the number of coins or credits to bet on the selected pay lines 32.

After activation of the pay lines 32, the reels 60*a-e* may be set in motion using the player input device 24, via the buttons 26 or the touch screen keys 30. The controller 34 may use a random number generator to select a game outcome corresponding to a particular set of reel locations. The controller 34 then causes the reels 60*a-e* to stop at the appropriate location. As shown in FIG. 3, the locations may be displayed to the player on the display 14 as a 3×5 array of symbols. Other arrays, having a larger or smaller array of symbols, i.e., 3×3 or 5×5, may be used with the present invention.

Winning game outcomes may be identifiable to the player by a pay table (not shown). A winning game outcome generally occurs when the symbols form a line pay or a scatter pay. A line pay occurs when symbols along an active pay line 32 correspond to one of the winning symbol combinations on the pay table. For example, a winning symbol combination could be three or more matching symbols along an active pay line, where the award is greater as the number of matching symbols along the active pay line increases. In one implementation, the winning combinations start from the leftmost reel 60*a* and span adjacent reels (left to right). In an alternative implementation, the winning combinations start from either the leftmost reel 60*a* (left to right) or the rightmost reel 60*e* (right to left) and span adjacent reels. A scatter pay occurs when scatter pay symbols are displayed anywhere on the display 14, regardless of whether the symbols are along an active pay line 32.

Included among the plurality of basic game outcomes is a start-bonus outcome for triggering play of a bonus game. A start-bonus outcome may be defined by any number of symbols or symbol combinations. For example, a start-bonus outcome may occur when a special symbol appears on one or more of the reels 60*a-e*. Alternatively, the start-bonus outcome may require a combination of symbols to appear along an active pay line 32 (i.e., a line trigger), or may require that a combination of symbols appear anywhere on the display 14 regardless of whether the symbols are along an active pay line 32 (i.e., a scatter trigger). In other embodiments, the start-bonus-outcome may occur due to other gaming conditions, such as time of play at the gaming machine, etc. The appearance of the appropriate start-bonus outcome causes the controller 34 to shift operation from the basic game to a bonus game.

In one particular embodiment, shown in FIG. 3, the basic wagering game shown on the display 14 consists of a variety of symbols associated with a "Welcome to Wolverton"™ wagering game. The symbols include townspeople and animals, town buildings, town signage, and other images. Certain of the symbols or combinations of the symbols may trigger a bonus game or the bonus game may be initiated by a mystery trigger (i.e., a trigger not visually recognizable by a player). For example, a full moon symbol (not shown) may trigger a bonus game. Once a bonus game is triggered, certain special effects associated with the wagering game may occur, such as a wolf howling, church bells chiming, portions of the screen being ripped apart by large claw marks, etc. Additionally, once the bonus game is triggered, certain symbols involved in triggering the bonus game may be altered to produce different, game-enhancing symbols, for example, wild symbols. In accordance with the present invention, once certain symbols are altered, those symbols may remain altered in a particular symbol location for the remainder of the wagering game and/or for subsequent plays of the wagering game.

Figure 4A:
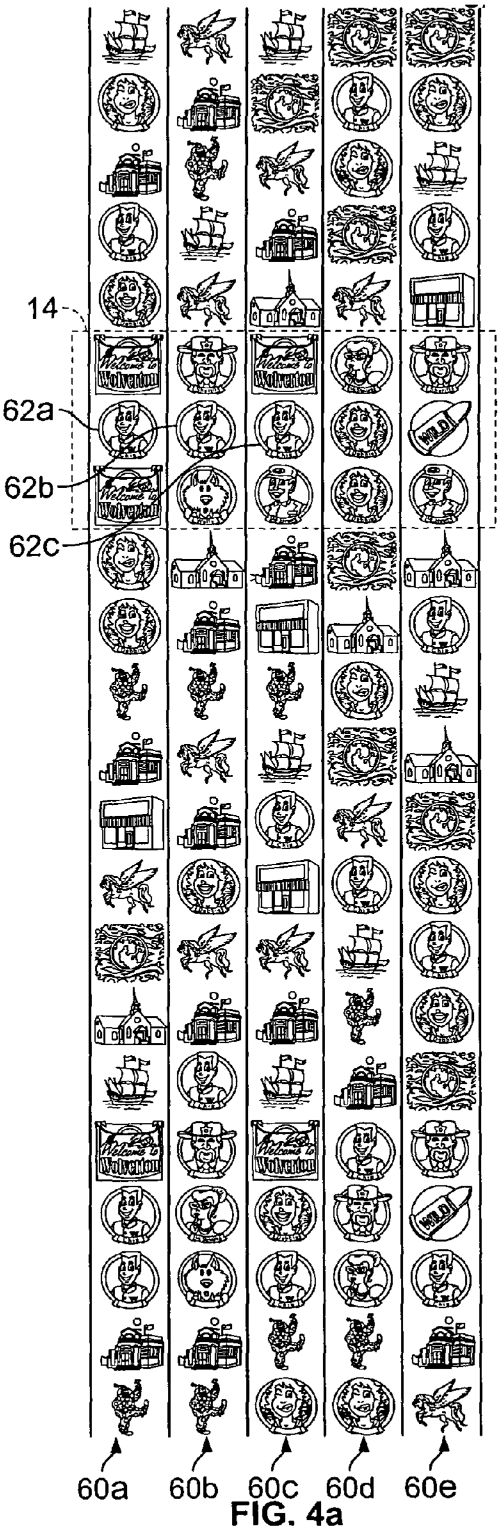
FIGS. 4*a* and 4*b* are views of an array of symbols located on a plurality of reel positions showing the symbol combination of FIG. 3.

For example, the appearance of three "CHIP" symbols 62*a-c* along a pay line 32 in the bonus game of FIG. 3 indicates a winning combination and the player may be awarded a bonus award, for example, credits, free spins, etc. Each of the three CHIP symbols 62*a-c* is associated with a particular location on the reels 60*a-c*, as shown in FIG. 4*a*. During normal play of the bonus game, the symbols 62*a-c*, as well as all of the other symbols on each of the reels 60*a-e*, remain the same and do not undergo any alterations. Upon achieving a winning symbol combination in the bonus game, however, certain symbols in particular symbol locations on the reels 60*a-e* may be transformed into altered symbols. The functions of the altered symbols in the particular symbol locations are also altered. The altered symbols and altered functions of those symbols persist during subsequent plays of the bonus game. However, other symbols (e.g., other CHIP symbols) not associated with the winning symbol combination do not undergo an alteration.

Figure 4B:
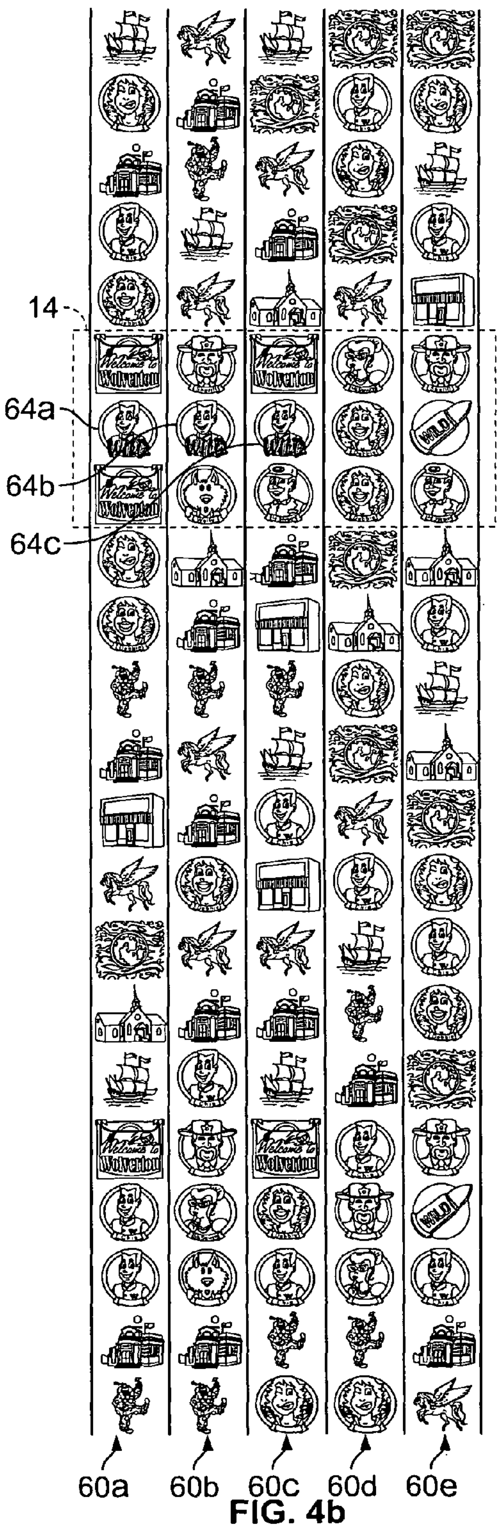

For example, once the three CHIP symbols 62*a-c* are involved in a winning symbol combination, the CHIP symbols 62*a-c* located in the particular symbol locations shown in FIG. 4*a* are transformed into WILD CHIP symbols 64*a-c* for subsequent plays of the bonus game, as shown in FIG. 4*b*. Thus, WILD CHIP symbols 64*a-c*, in their respective symbol locations, will stay altered for as long as the bonus game continues. The WILD CHIP symbols 64*a-c* act as wild symbols to increase the chances of obtaining winning symbol combinations in subsequent spins. As indicated by FIGS. 4*a* and 4*b*, other CHIP symbols at other symbol locations shown on the reels 60*a-c* that are not involved in the winning symbol combination are not altered into different symbols. Similarly, CHIP symbols at symbol locations on reels 60*d* and 60*e* are not altered into different symbols. Thus, only the CHIP symbols in the specific symbol locations associated with CHIP symbols 62*a-c* are altered to form different, game-enhancing symbols 64*a-c*.

Once the player receives a winning symbol combination, the display 14 may provide a line-win message 66 that describes the winning symbol combination. For example, if a player wins 250 credits on a first play of the bonus game, the line-win message 66 would read "Last Win: 250 Credits" on the display 14 as shown in FIG. 3. This line-win message 66 allows the player to see his or her prior win if the player accidentally "plays through" the winning outcome. This line-win message 66 may be maintained during subsequent game play so that the player is able to review the last award received.

In other embodiments, the line-win message 66 may display the largest award for a particular gaming session. The last or largest award may be displayed on the display 14 (or the second display 16) for only one subsequent game or until another winning outcome occurs in subsequent games. Alternatively or additionally, the line-win message 66 may display the number of spins since the last win in addition to the total amount awarded, the last amount awarded or the largest amount awarded. The player may also be able to scroll back to see the outcomes of prior winning games and/or the winning symbols/combinations that were included in the winning outcome. This may be accomplished via the buttons 26 or touch screen keys 30, or other mechanisms for inputting player information. The line-win message 66 may be displayed in other locations, such as the secondary display 16 or on the belly glass.

Figure 5:
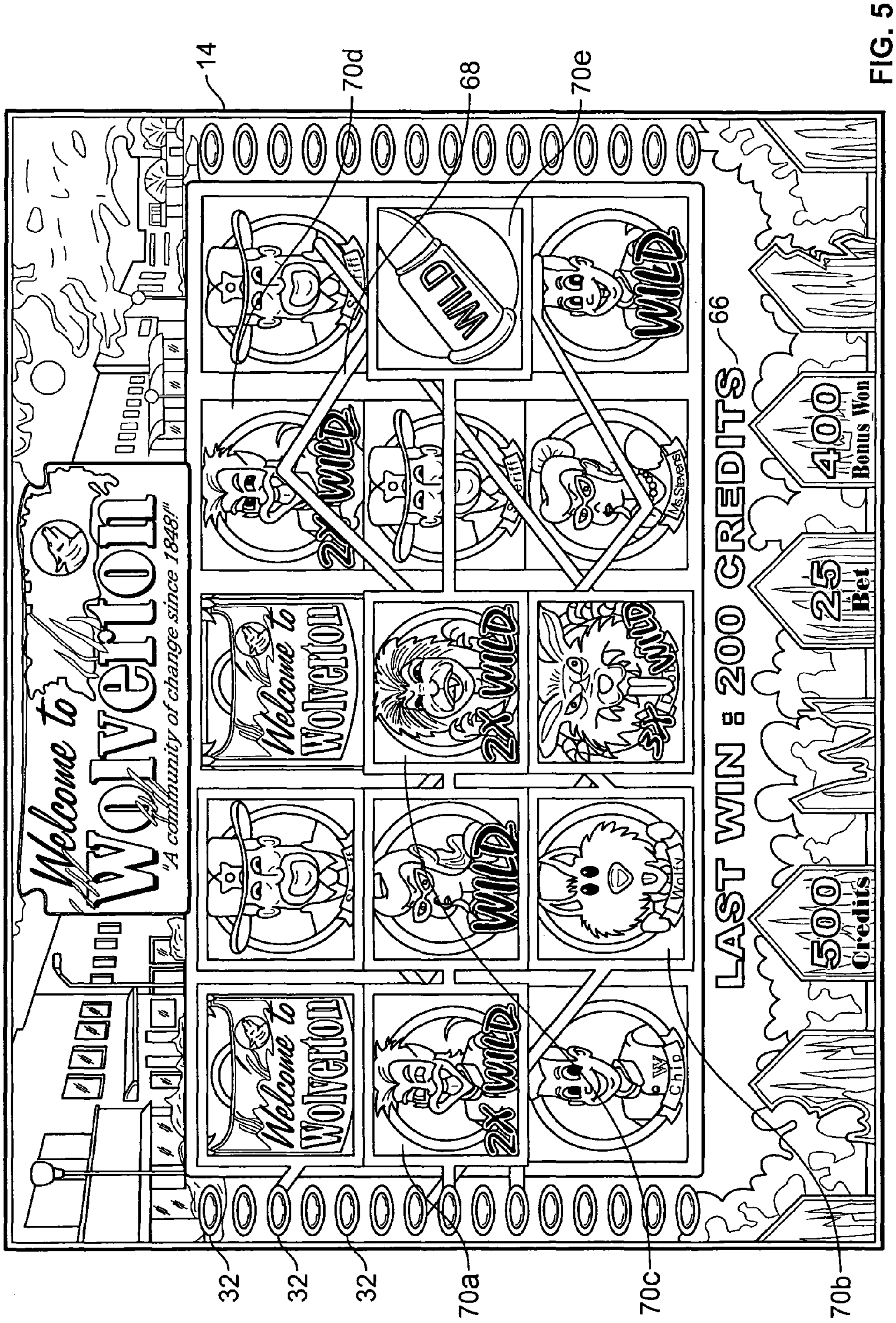
FIG. 5 is a view of a display showing winning symbol combinations including a plurality of wild symbols.
Figure 6A:
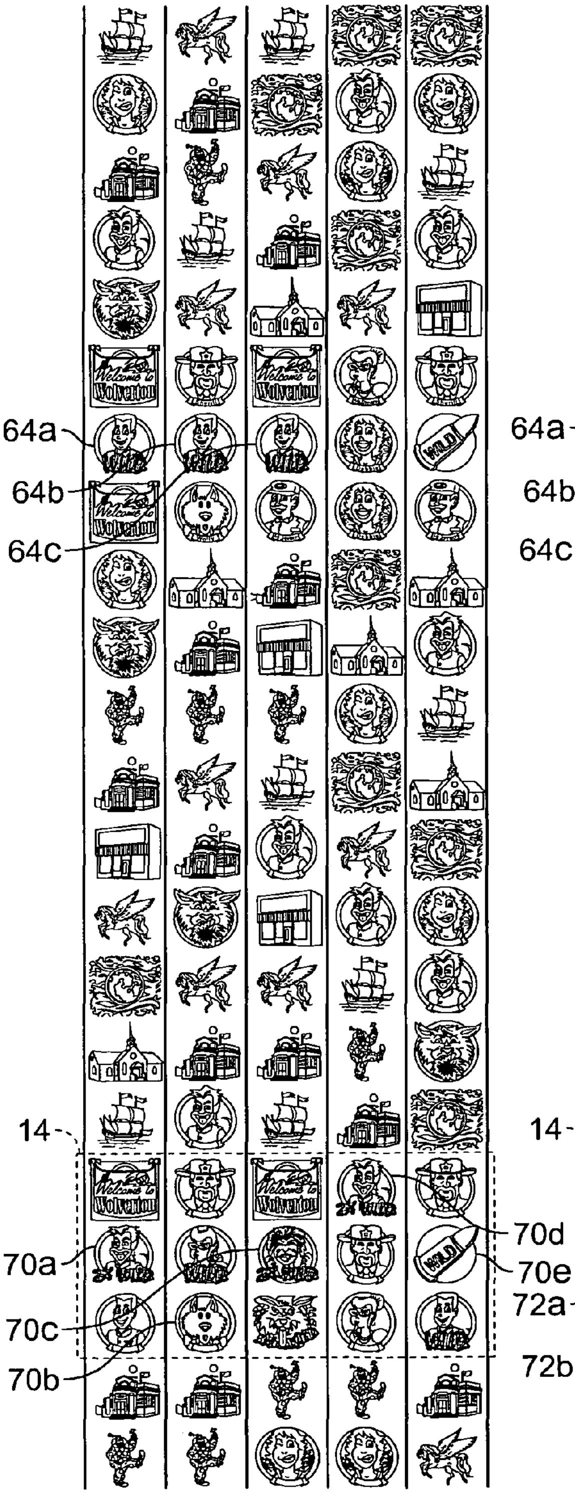
FIGS. 6*a* and 6*b* are views of an array of symbols located on a plurality of reel positions showing the symbol combination of FIG. 5.
Figure 6B:
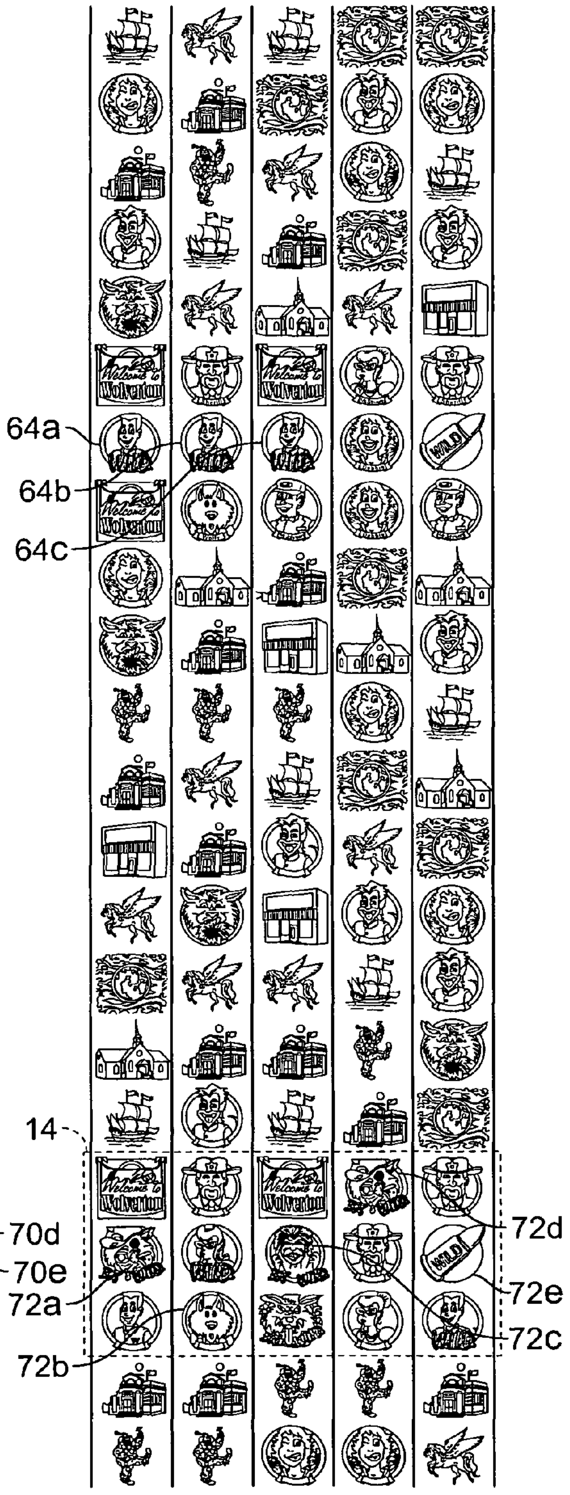
Figure 7:
FIG. 7 is a view of a player using an earpiece option with a gaming machine.

In some embodiments, if any of the altered symbols are included in subsequent winning symbol combinations, the altered symbols and corresponding functions may be further transformed into different alterations of the symbol and corresponding function. For example, as shown in FIG. 5, a winning symbol combination occurs on the display 14 along pay line 68 that involves reel locations 70*a-e*, specifically a CHIP 2× WILD, a WOLFY, a DEBBIE 2× WILD, a CHIP 2× WILD and a SILVER BULLET WILD, respectively. The previously-altered symbols, namely 70*a* (the CHIP 2× WILD), 70*c* (the DEBBIE 2× WILD) and 70*d* (the CHIP 2× WILD), become further altered (as seen in FIGS. 6*a* and 6*b*). In this example, altered symbols 70*a*, 70*c* and 70*d* are transformed into 3× WILDS and become further altered symbols 72*a*, 72*c* and 72*d*. These further altered symbols 72*a*, 72*c*, 72*d* remain as 3× WILD symbols for the remainder of the bonus game. As more symbols are transformed into wild symbols, more multiplier wild symbols (e.g., 2×, 3×) are transformed, thereby increasing the changes of achieving a winning symbol combination and higher awards. Often, multiple wins involving multiplying wilds may be possible with each spin of the bonus game.

As discussed above, only certain altered symbols at specific reel locations may persist throughout the bonus game. Although each reel may have the same symbol repeated multiple times at different locations on the reel, only the actual symbol occupying that particular symbol location (which was part of a winning symbol combination) may become wild (or another enhanced function) and persist throughout play of the bonus game. It is contemplated that although the transformations described herein include transformations of symbols involved in winning combinations to WILD symbols, such transformation may be applied to any symbol in any particular symbol location that is displayed to a player after the reels are stopped.

For example, in one embodiment, all symbols that are displayed to the player on the display 14 may be altered to form WILD symbols that are associated with the specific reel locations, i.e., all fifteen symbols in the 3×5 array of symbols are changed to WILD symbols. To accommodate these transformations, it may be desirable to have larger reels with an increased number of reel locations. This keeps the game play, numbers of WILDS appearing after each spin, etc. fairly constant between the different types of games. Otherwise, all of the symbols on each of the reels 60*a-e* could be altered into different, game-enhancing symbols after only a few plays of the wagering game.

In other embodiments, all of the symbols on particular reels that are involved in winning combinations may be altered. For example, as shown in FIG. 3, the three winning CHIP symbols on reels 60*a-c* may cause all of the displayed symbols on reels 60*a-c* to be altered to different, game-enhancing symbols while the symbols on reels 60*d-e* do not change. Furthermore, other winning and non-winning combinations of symbols may trigger an alteration of the symbols at specific reel locations, such as scatter wins (i.e., based on non-line winning combinations), location-specific alterations based on particular reel locations being selected by a player (though not necessarily involved in a winning combination), symbol-specific alterations (based on a particular symbol displayed on the display 14), random or mystery alterations of symbols by the controller 34, etc. In essence, any symbol at any reel location is capable of being altered and remaining in the altered state for subsequent plays of the wagering game.

Additionally, in other embodiments, transformations to other symbols and corresponding game-enhancing functions other than WILD symbols is contemplated, such as changing symbols to FREE SPINS, BONUS or other symbols, changing symbols to match other adjacent symbols, etc. In these embodiments, as with the WILD symbol embodiments described herein, the altered symbols in the particular reel locations remain altered for subsequent plays of the wagering game. Moreover, while it has been described that the alterations involve changing symbols into game-enhancing symbols, it is also contemplated that some of the symbols may be changed into symbols that are non-game-enhancing symbols, such as game-terminating symbols, symbols that change other adjacent symbols back into the normal symbols, etc.

The bonus game may continue until an end-bonus outcome is achieved. In some embodiments, this may occur when a certain symbol appears in a winning combination or anywhere on the reels 60*a-e* shown on the display 14. Other game-terminating features known in the art may also be used. The altered symbols may then return to their original states once the bonus game is over. In some embodiments, it is contemplated that the altered state of the symbols may persist for a certain number of subsequent game plays or spins of the basic game or for a certain period of time after the bonus game has ended.

In yet other embodiments, a player is allowed to choose one or more reel symbols which may be transformed into a wild symbol when the selected symbol appears on the display 14. For example, a player may choose between three transformable characters, each character being located on a different reel 60 in the bonus game. The selection of one of the characters may be a "blind pick" or the player may be allowed to knowingly choose a character. During play of the bonus game, whenever the selected character appears on the display 14, the symbol is transformed into a WILD symbol or other game-enhancing symbol. Similar to the embodiments described above, as each of the transformable characters is associated with a particular symbol location, only the selected character in the particular symbol location will be transformed when it appears on the display 14. As described herein, the transformable character may be further transformed into different alterations of the character, such as a 2× WILD, 3× WILD, etc., whenever the selected character in the particular symbol location appears on the display 14 in subsequent spins of the bonus game.

As the invention described herein has been directed to use in a bonus game, it is contemplated that the alteration of the symbols in particular symbol locations on the plurality of reels may also be incorporated into a basic game. The symbol alteration may occur for a certain period of time or for a certain number of plays or spins of the basic game. Furthermore, while the invention is described herein with respect to video reels, it is also contemplated that mechanical reels may be used with the present invention. There are various ways of incorporating images over the mechanical reels, such as, for example, via a transmissive display. Examples of ways in which to incorporate images over mechanical reels are described in commonly-owned U.S. Pat. No. 6,517,433 and PCT/US2006/026005, which are herein incorporated by reference in their entirety.

In other variations of the wagering game, players may be able to listen to play of the wagering game via an earpiece option 80 that is connected to the gaming machine 10 or hand-held device 110. The earpiece option 80 provides quiet, localized sound that is directed to a hearing-impaired player of the gaming machine 10, 110, or any player of the gaming machine 10, 110. The earpiece option 80 may be portable, is smaller than a headset unit, and may offer more privacy to a player at the gaming machine 10, 110. The earpiece option 80 may be connected via a wired or wireless connection and would eliminate the need for speakers at the gaming machine 10, 110. For example, in one commercial embodiment, "BLUETOOTH®" mobile headsets may be used to transmit wireless communications to the player at the gaming machine 10, 110.

Each of these embodiments and obvious variations thereof is contemplated as falling within the spirit and scope of the claimed invention, which is set forth in the following claims.

What is claimed is:

1. A gaming system comprising:

at least one input device;

at least one display device;

at least one processor;

at least one memory device storing instructions that, when executed by the at least one processor, cause the gaming system to:

display an evaluable array and a plurality of symbol-bearing reels on the at least one display device, each reel including a plurality of reel locations having symbols that indicate a randomly selected outcome of a wagering game after the plurality of symbol-bearing reels stop with respect to the evaluable array, wherein a first symbol is positioned at at least a first reel location and a second reel location;

receive a wager to receive at least a first evaluation of the array;

virtually rotate the plurality of symbol-bearing reels relative to the evaluable array;

in response to a certain event in the wagering game, automatically alter the first symbol at the first reel location to produce an altered function of the first symbol at the first reel location, the first symbol at the first reel location and altered function selected by the processor, and leave the first symbol at the second reel location unaltered; and maintain the altered function of the first symbol at the first reel location during a subsequent virtual rotation of the plurality of symbol-bearing reels relative to the evaluable array.

2. The gaming system of claim 1, wherein the alteration of the first symbol at the first reel location occurs in a bonus game.

3. The gaming system of claim 2, the at least one memory device storing further instructions that, when executed by the at least one processor, cause the gaming system to alter the first symbol at the first reel location to a wild symbol function.

4. The gaming system of claim 1, the at least one memory device storing further instructions that, when executed by the at least one processor, cause the gaming system to further alter the first symbol at the first reel location after the first alteration.

5. The gaming system of claim 4, the at least one memory device storing further instructions that, when executed by the at least one processor, cause the gaming system to further alter the first symbol at the first reel location from a wild symbol to a wild-multiplier symbol for multiplying an award in response to the wild symbol appearing in a winning symbol combination of the evaluable array.

6. The gaming system of claim 1, wherein the certain event includes achieving a winning outcome of the evaluable array that includes the first symbol.

7. The gaming system of claim 6, wherein the winning combination of the evaluable array includes a line-win or a scatter-win.

8. The gaming system of claim 1, wherein the certain event includes displaying the first symbol at the first reel location when the first reel location is displayed on the display as part of the evaluable array.

9. The gaming system of claim 8, wherein the first symbol at the first reel location is not included in a winning combination of the evaluable array.

10. The gaming system of claim 1, wherein the first symbol appears in multiple reel locations on each of the plurality of symbol-bearing reels but only the first symbol in the first reel location is altered to produce an altered function of the first symbol.

11. The gaming system of claim 1, wherein the first symbol appears in multiple symbol locations on one of the plurality of symbol-bearing reels but only the first symbol in the first reel location is altered to produce an altered function of the first symbol.

12. A computer-implemented method in a gaming system, comprising:

displaying on at least one display device an evaluable array and a plurality of symbol-bearing reels, each reel including a plurality of reel locations having symbols that indicate a randomly selected outcome of a wagering game after the plurality of symbol-bearing reels stop with respect to the evaluable array, wherein a first symbol is positioned at a first reel location and the same first symbol is positioned at a second reel location;

receiving a wager in response to an input via at least one input device to receive a first evaluation of the array;

virtually rotating the plurality of symbol-bearing reels relative to the evaluable array;

automatically altering the first symbol at the first reel location by at least one of one or more processors to produce an altered function of the first symbol at the first reel location, wherein the first symbol at the first reel location is selected by the at least one or more processors and while leaving the same first symbol at the second reel location unaltered; and maintaining the altered function of the first symbol at the first reel location by at least one of the one or more processors during at least one subsequent virtual rotation of the plurality of symbol-bearing reels relative to the evaluable array.

13. The computer-implemented method of claim 12, further including awarding an award by at least one of the one or more processors based on the altered first symbol at the first reel location in an evaluation of the evaluable array resulting from the at least one subsequent virtual rotation.

14. The computer-implemented method of claim 12, further including continuing to alter the first symbol at the first reel location by at least one of the one or more processors in response to the altered symbol appearing in a winning symbol combination of an evaluable array resulting from the subsequent at least one virtual rotation.

15. The computer-implemented method of claim 12, wherein the altering includes altering the first symbol at the first reel location to a wild symbol.

16. The computer-implemented method of claim 15, wherein the altering includes further altering the wild symbol to a wild multiplier symbol for multiplying an award in response to the wild symbol appearing in a winning symbol combination in an evaluable array resulting from the at least one subsequent virtual rotation.

17. The computer-implemented method of claim 12, wherein the altering the first symbol is performed in response to the occurrence of the first symbol at the first reel location in a winning outcome of the evaluable array.

18. The computer-implemented method of claim 12, further including altering a second symbol in a third reel location by at least one of the one or more processors to change the function of the second symbol.

19. The computer-implemented method of claim 18, further including maintaining the altered first and second symbols during at least one subsequent virtual rotation.

20. A gaming system comprising:

at least one input device;

at least one display device;

at least one processor;

at least one memory device storing instructions that, when executed by the at least one processor, cause the gaming system to:

receive a wager;

display a plurality of reels, each reel having a plurality of reel locations;

in response to a special event, automatically alter the function of a first symbol at a first reel location, to create an altered-function symbol, the alteration of the first symbol at the first reel location not altering the function of other like first symbols that are not part of the special event;

maintain the altered-function symbol at the first particular reel location for subsequent game play; and award a payout in response to the altered-function symbol at the first reel location being included in a winning outcome in the subsequent game play of the wagering game.

21. The gaming system of claim 20, wherein the at least one memory device stores instructions that, when executed by the at least one processor, cause the gaming system to alter the display of the first symbol at the first reel location.

22. The gaming system of claim 20, wherein the at least one memory device stores instructions that, when executed by the at least one processor, cause the gaming system to perform the altering, maintaining, and awarding during a bonus game.

23. The gaming system of claim 20, wherein the special event includes achieving a certain symbol or symbol combination on the display.

24. The gaming system of claim 20, wherein the at least one memory device stores instructions that, when executed by the at least one processor, cause the gaming system to alter a second symbol at a second reel location to change the function of the second symbol.

25. The computer-implemented method of claim 18, further including continuing play of the wagering game with the altered first and second symbols at the first reel location and the second reel location, respectively.

* * * * *